(12) United States Patent
Bhogal et al.

(10) Patent No.: US 9,507,491 B2
(45) Date of Patent: Nov. 29, 2016

(54) SEARCH ENGINE OPTIMIZATION UTILIZING SCROLLING FIXATION

(71) Applicant: International Business Machines Corporation, Armonk, NY (US)

(72) Inventors: Kulvir S. Bhogal, Fort Worth, TX (US); Lisa Seacat DeLuca, San Francisco, CA (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/715,865

(22) Filed: Dec. 14, 2012

(65) Prior Publication Data
US 2014/0173506 A1  Jun. 19, 2014

(51) Int. Cl.
*G06F 3/0481* (2013.01)
*G06F 3/0485* (2013.01)
*G06F 17/30* (2006.01)

(52) U.S. Cl.
CPC ....... *G06F 3/04817* (2013.01); *G06F 3/04855* (2013.01); *G06F 17/30864* (2013.01); *G06F 17/30899* (2013.01); *G06F 3/0481* (2013.01)

(58) Field of Classification Search
CPC ............ G06F 3/04855; G06F 3/0481; G06F 17/30899; G06F 3/04817; G06Q 30/00
USPC .................. 715/787, 745, 786, 700; 709/224
See application file for complete search history.

(56) References Cited

U.S. PATENT DOCUMENTS

| | | | |
|---|---|---|---|
| 5,623,588 A | 4/1997 | Gould | |
| 5,973,663 A * | 10/1999 | Bates | G06F 3/04855 715/205 |
| 6,226,645 B1 | 5/2001 | Bae et al. | |
| 6,339,437 B1 | 1/2002 | Nielsen | |
| 6,369,819 B1 | 4/2002 | Pitkow et al. | |
| 6,590,594 B2 | 7/2003 | Bates et al. | |
| 6,885,363 B2 | 4/2005 | Smith | |
| 6,956,591 B2 | 10/2005 | Lundin et al. | |
| 6,963,874 B2 | 11/2005 | Kasriel et al. | |
| 7,693,869 B2 | 4/2010 | Hutson et al. | |
| 7,725,422 B2 | 5/2010 | Ryan et al. | |
| 7,836,408 B1 | 11/2010 | Ollmann et al. | |
| 8,229,911 B2 | 7/2012 | Bennett | |
| 8,990,192 B2 | 3/2015 | Bhogal et al. | |

(Continued)

OTHER PUBLICATIONS

US Patent Application, dated Mar. 25, 2014, for U.S. Appl. No. 14/224,914, filed Mar. 25, 2014, entitled. "Search Engine Optimization Utilizing Scrolling Fixation", invented by K.S. Bhogal et al., pp. 1-27.

(Continued)

*Primary Examiner* — Ajay Bhatia
*Assistant Examiner* — Mong-Shune Chung
(74) *Attorney, Agent, or Firm* — Janaki K. Davda; Konrad, Raynes, Davda and Victor LLP

(57) ABSTRACT

Provided are techniques for utilizing scrolling fixation. An amount of time a user spends on a portion of a page based on scroll bar usage by the user is monitored. The amount of time the user spends on the portion of the page is aggregated with an amount of time at least one other user spent on that portion of the page based on scroll bar usage by the at least one other user. A scroll bar is displayed with at least one indicator, wherein the at least one indicator represents an aggregated amount of time spent on an associated portion of the page.

16 Claims, 6 Drawing Sheets

(56) References Cited

U.S. PATENT DOCUMENTS

| | | | |
|---|---|---|---|
| 8,996,512 | B2 | 3/2015 | Bhogal et al. |
| 2003/0231196 | A1* | 12/2003 | Keohane et al. ............. 345/700 |
| 2006/0075357 | A1 | 4/2006 | Guido et al. |
| 2006/0155728 | A1 | 7/2006 | Bosarge |
| 2007/0038608 | A1 | 2/2007 | Chen |
| 2007/0277121 | A1* | 11/2007 | Beckman ..................... 715/847 |
| 2008/0046218 | A1 | 2/2008 | Dontcheva et al. |
| 2008/0243613 | A1 | 10/2008 | Silvestri et al. |
| 2009/0138445 | A1 | 5/2009 | White et al. |
| 2010/0036828 | A1 | 2/2010 | Carmel et al. |
| 2010/0125781 | A1 | 5/2010 | Gadacz |
| 2010/0131870 | A1 | 5/2010 | Park |
| 2010/0145954 | A1 | 6/2010 | Barlin et al. |
| 2011/0047028 | A1 | 2/2011 | Kim et al. |
| 2011/0125555 | A1 | 5/2011 | Fradkin |
| 2011/0161260 | A1 | 6/2011 | Burges et al. |
| 2011/0202522 | A1 | 8/2011 | Ciemiewicz et al. |
| 2011/0225134 | A1 | 9/2011 | Monga et al. |
| 2011/0258535 | A1* | 10/2011 | Adler et al. .................. 715/235 |
| 2011/0307462 | A1 | 12/2011 | Holsman et al. |
| 2011/0314042 | A1 | 12/2011 | Nuggehalli et al. |
| 2012/0023104 | A1 | 1/2012 | Johnson et al. |
| 2012/0036119 | A1 | 2/2012 | Zwicky et al. |
| 2012/0131187 | A1* | 5/2012 | Cancel et al. ................ 709/224 |

OTHER PUBLICATIONS

Preliminary Remarks, dated Mar. 25, 2014, for U.S. Appl. No. 14/224,914, filed Mar. 25, 2014, entitled. "Search Engine Optimization Utilizing Scrolling Fixation", invented by K.S. Bhogal et al., pp. 1-2.

Brajnik, G., "Ranking Websites through Prioritized Web Accessibility Barriers", University of Udine, Italy, Sep. 29, 2006, pp. 1-8.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Richardson, M., A. Prakash, and E. Brill, "Beyond PageRank: Machine Learning for Static Ranking", IW3C2 ACM, Edinburgh, Scotland, May 23-26, 2006, pp. 1-9.

U.S. Appl. No. 13/715,815, filed Dec. 14, 2012, entitled "Search Engine Optimization using a Find Operation", invented by Bhogal, K.S., L.S. DeLuca, J.S. Li, and R.R. Peterson, Total 36 pp. [54.85 (Appln)].

Crestani, F. et al., "Is This Document Relevant? . . . Probably: A Survey of Probabilistic Models in Information Retrieval", dated Dec. 1998, ACM Computing Surveys, vol. 30, No. 4, Total 25 pages.

Preliminary Amendment, dated Mar. 26, 2014, for U.S. Appl. No. 13/715,815, filed Dec. 14, 2012, invented by K.S. Bhogal et al., Total 6 pages.

Office Action, dated Jun. 5, 2014, for U.S. Appl. No. 13/715,815, filed Dec. 14, 2012, invented by K.S. Bhogal et al., Total 19 pages.

Response to Office Action, dated Sep. 5, 2014, for U.S. Appl. No. 13/715,815, filed Dec. 14, 2012, invented by K.S. Bhogal et al., Total 11 pages.

Notice of Allowance, dated Nov. 14, 2014, for U.S. Appl. No. 13/715,815, filed Dec. 14, 2012, invented by K.S. Bhogal et al., Total 15 pages.

Notice of Allowance, dated Nov. 24, 2014, for U.S. Appl. No. 14/225,880, filed Mar. 26, 2014, invented by K.S. Bhogal et al., Total 13 pages.

Preliminary Remarks, dated Mar. 26, 2014, for U.S. Appl. No. 14/225,880, filed Mar. 26, 2014, invented by K.S. Bhogal et al., Total 2 pages.

Office Action, dated Jun. 5, 2014, for U.S. Appl. No. 14/225,880, filed Mar. 26, 2014, invented by K.S. Bhogal et al., Total 16 pages.

Response to Office Action, dated Sep. 5, 2014, for U.S. Appl. No. 14/225,880, filed Mar. 26, 2014, invented by K.S. Bhogal et al., Total 6 pages.

Office Action, dated Apr. 11, 2016, for U.S. Appl. No. 14/224,914, filed Mar. 25, 2014, invented by K.S. Bhogal et al., Total 23 pages.

Response to Office Action, dated Jul. 11, 2016, for U.S. Appl. No. 14/224,914, filed Mar. 25, 2014, invented by K.S. Bhogal et al., Total 7 pages.

Notice of Allowance, dated Jul. 28, 2016, for U.S. Appl. No. 14/224,914, filed Mar. 25, 2014, invented by K.S. Bhogal et al., Total 22 pages.

* cited by examiner

SEARCH ENGINE OPTIMIZATION UTILIZING SCROLLING FIXATION

FIELD

Embodiments of the invention relate to search engine optimization utilizing scrolling fixation.

BACKGROUND

Online search engines are tools for connecting end-users with desired web pages. A user enters a search request made up of one or more search keywords, and a search engine returns a list of web pages that were located based on the one or more search keywords. Searching for content on the world wide web is becoming a more difficult task as more and more content has been added online

SUMMARY

Provided are a method, computer program product, and system for utilizing scrolling fixation. An amount of time a user spends on a portion of a page based on scroll bar usage by the user is monitored. The amount of time the user spends on the portion of the page is aggregated with an amount of time at least one other user spent on that portion of the page based on scroll bar usage by the at least one other user. A scroll bar is displayed with at least one indicator, wherein the at least one indicator represents an aggregated amount of time spent on an associated portion of the page.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
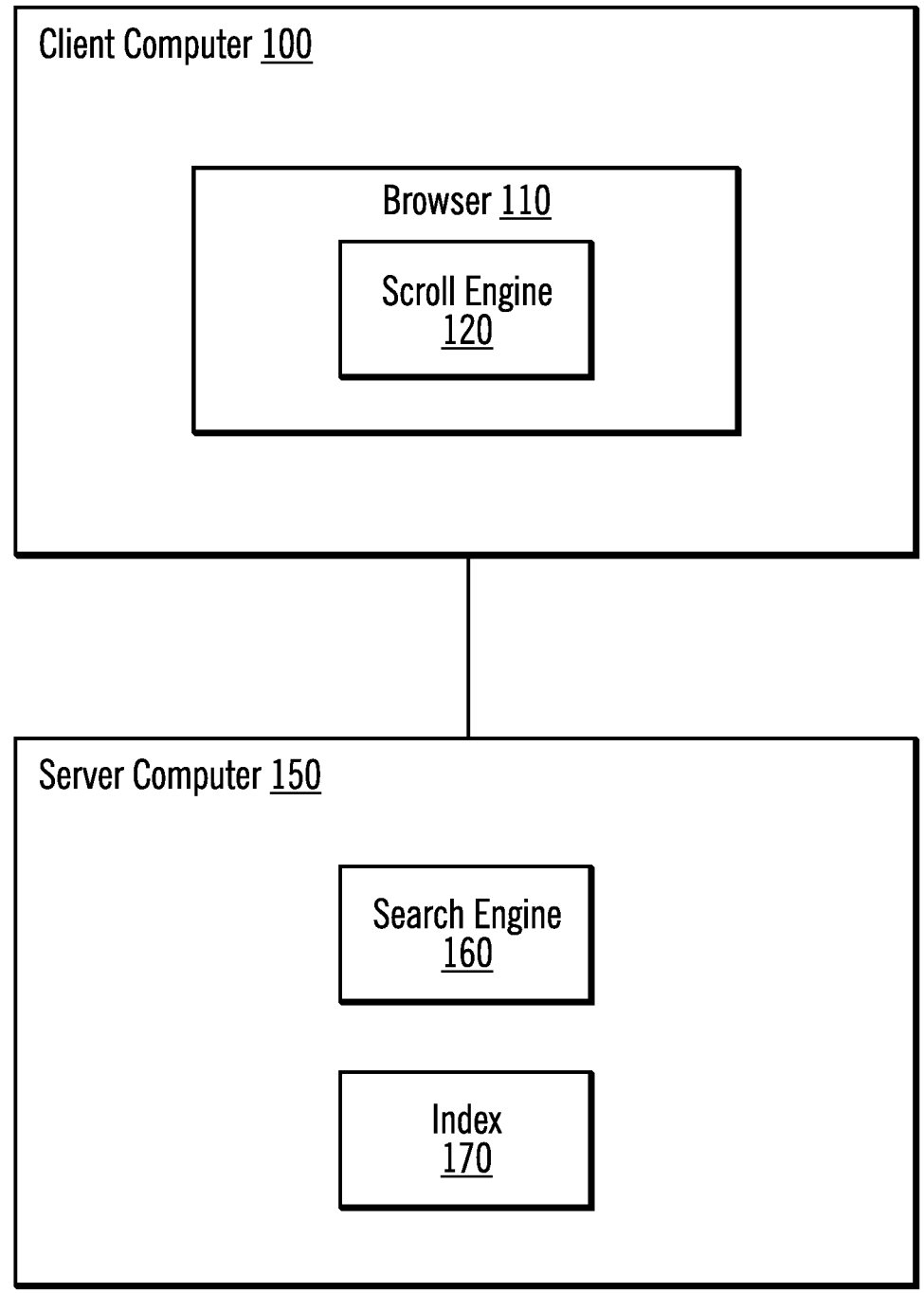
FIG. 1 illustrates, in a block diagram, a computing environment in accordance with certain embodiments.

FIG. 1 illustrates, in a block diagram, a computing environment in accordance with certain embodiments. A client computer 100 is coupled to a server computer 150. The client computer 100 includes a browser 110 that may be used to issue search requests. In certain embodiments, the browser 110 includes a scroll engine 120. In such embodiments, the scroll engine 120 may be a plug-in to the browser 110. In other embodiments, the scroll engine 120 may be separate from the browser 110.

The server computer 150 includes a search engine 160 and an index 170. The search engine 160 receives a search request from the browser 110, executes a search of one or more data stores (e.g., the World Wide Web (WWW) or Internet, a company's internal data stores, etc.), ranks the search results, and returns the search results to the browser 110. The browser 110 may display or otherwise provide the search results to a searcher (e.g., an end-user, an application, etc.).

The scroll engine 120 uses scroll bar information to help determine search optimization. The scroll engine 120 determines time spent on areas of a page (e.g., a web page, document page, etc.) through analysis of the scrollbar locations as a user moves the scrollbar through the page. The scroll engine 120 uses historical information from other searches (issued by the same or different user as a current user) to determine highlighting of the scroll bar. In certain embodiments the scroll engine 120 uses different colors to specify additional information to the users. The scroll engine 120 takes into account what a user is actually viewing on a page and feeds that information back to the search providers and/or to the search engine 160 and, in turn, to other searchers. A search provider may be described as a company that provides the search engine 160.

Figure 2:
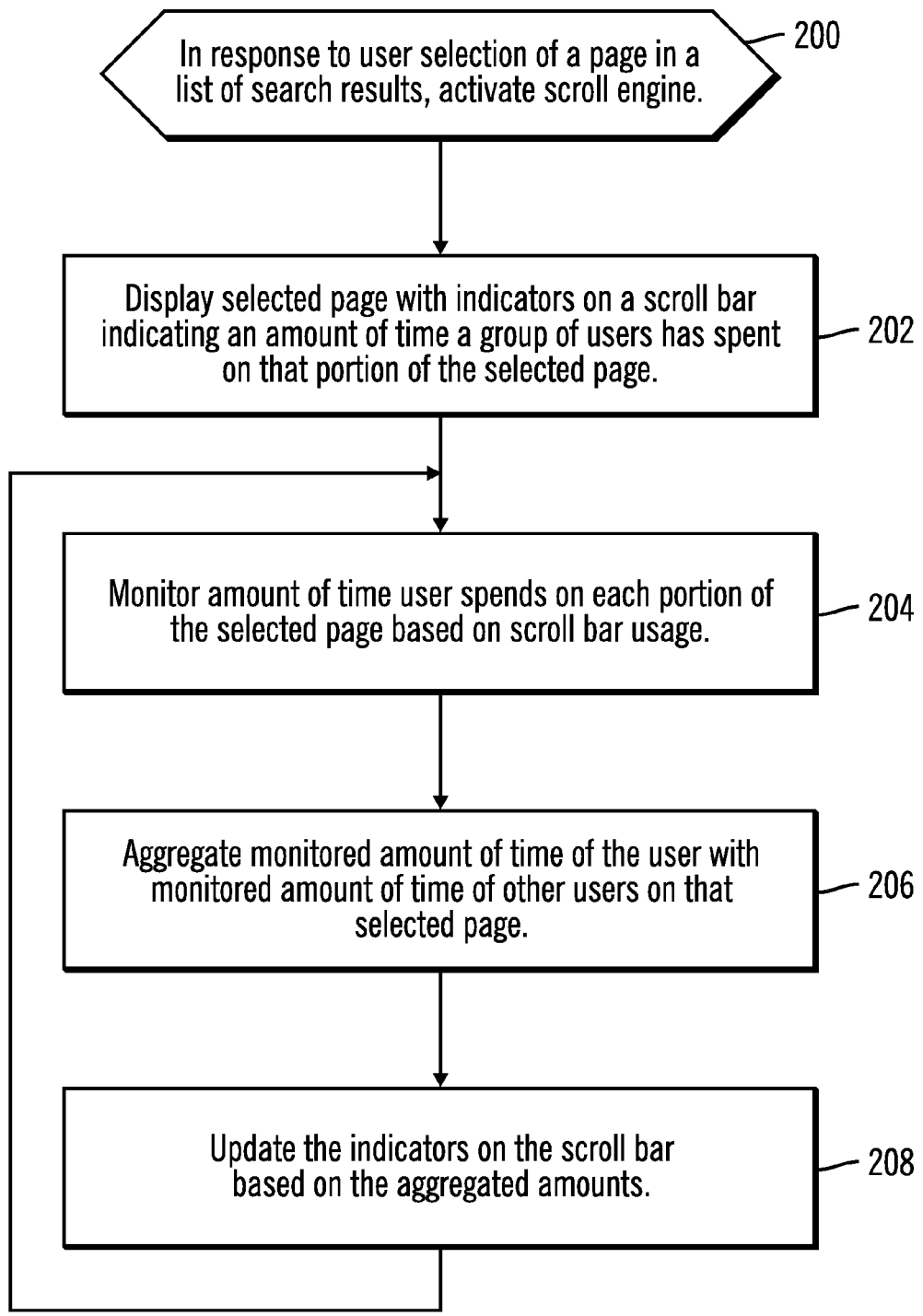
FIG. 2 illustrates, in a flow diagram, operations performed by the scroll engine 120 in accordance with certain embodiments.

FIG. 2 illustrates, in a flow diagram, operations performed by the scroll engine 120 in accordance with certain embodiments. Control begins at block 200. In block 200, in response to user selection of a page in a list of search results (provided by the search engine 160 to the browser 110), the scroll engine is activated. In alternative embodiments, the scroll engine 120 may be activated in alternative ways (e.g., user selection of a scroll engine tool).

In block 202, the scroll engine 120 displays the selected page with indicators (e.g., hot spots) on a scroll bar indicating an amount of time a group of users has spent on that portion of the selected page.

In block 204, the scroll engine 120 monitors an amount of time the user spends on each portion of the selected page based on scroll bar usage. For example, the amount of time may represent the amount of time a user spends on reading or watching (e.g., if a video is available to be played) a certain portion of the page. The amount of time the user spends on each portion of the selected page may also be referred to as scrolling fixation (i.e., when a users eyes are fixating on a portion of a selected page).

In certain embodiments, the scroll engine 120 implements a counter that is associated with a horizontal portion (e.g., horizontal strip) of the page. In various embodiments, the entire page may be partitioned into horizontal portions or a portion of the page may be partitioned into horizontal portions, and each of the horizontal portions is associated with a different counter. In certain embodiments, a group of horizontal portions may be associated with a single counter (e.g., with a user selecting the group of horizontal portions).

In certain embodiments, the scroll engine 120 implements a counter that is associated with a vertical portion (e.g., vertical strip) of the page. In various embodiments, the entire page may be partitioned into vertical portions or a portion of the page may be partitioned into vertical portions, and each of the vertical portions is associated with a different counter. In certain embodiments, a group of vertical portions may be associated with a single counter (e.g., with a user selecting the group of vertical portions).

In embodiments, as the user scrolls through the page, different counters are incremented based on the amount of time the user stays on a portion of the page. In certain embodiments, a counter for a portion is incremented when a user leaves the scroll bar on that portion for a minimum amount of time. In certain embodiments, if a user leaves the scroll bar on a portion for more than a maximum amount of time, the counter is not incremented or is set to a default (e.g., to take into account a user who leaves the computing device so that the scroll bar stays in the same position for a long period of time).

In block 206, the scroll engine 120 aggregates the monitored amount of time of the user with monitored amount of time of other users on that selected page. In certain embodiments, the scroll bar data is aggregated from different users and accumulated at the search provider on a per page basis.

In block 208, the scroll engine 120 updates the indicators on the scroll bar based on the aggregated amounts. In certain embodiments, the scroll engine 120 updates the indicators on the scroll bar based on the totals of the aggregated amounts (i.e., the total time spent by users). In certain embodiments, the scroll engine 120 updates the indicators on the scroll bar based on an average of the aggregated amounts (i.e., an average time spent by users). From block 208, processing may optionally loop back to block 204 any number of times.

Based on the indicators, a user may opt to jump to portions of the page on which users spent more time (e.g., which may represent that the users found these portions of the page more interesting than other portions of the page) as indicated by the indicator visualization.

Figure 3:
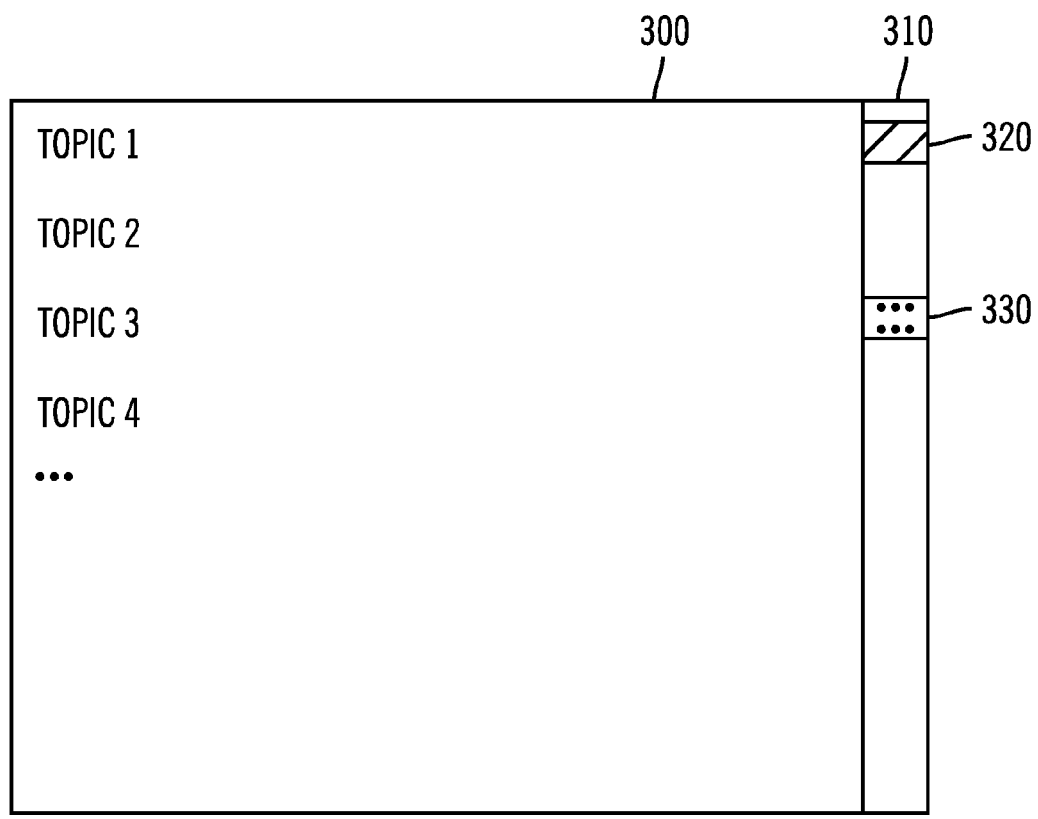
FIG. 3 illustrates an example page with a scroll bar having indicators in accordance with certain embodiments.

FIG. 3 illustrates an example page 300 with a scroll bar 310 having indicators 320, 330 in accordance with certain embodiments. In this example, a user selected the page 300 from a set of search results provided by the search engine 160 to the browser 110 and displayed by the browser 110. The page 300 is displayed with content (Topic 1, Topic 2, Topic 3, Topic 4, . . . ). The scroll bar shows indicator 320 with diagonal lines to indicate an amount of time associated with Topic 1 and shows indicator 330 with dots to indicate an amount of time associated with Topic 3.

In certain embodiments, as pages have their content change, the indicators on the scroll bar are updated. Also, in certain embodiments, when content changes, the amount of time spent on a portion of a page data may be considered obsolete by the search provider and no longer provided.

In certain embodiments, the search engine 110 sends feedback data to search providers. In certain embodiments, users may opt out of providing search optimization data to search providers. In certain embodiments, the search optimization data is made anonymous to alleviate privacy concerns.

In certain embodiments, the scroll engine 120 uses colors to indicate popularity. For example, a green indicator may identify more popular portions of a page, followed by orange, then red, etc. In certain embodiments, the scroll engine 120 may use shades of a color to indicate popularity. For example, the darkest shade may identify more popular portions of a page down to a lighter color for those portions that are less popular. In certain embodiments, the color may be used to represent an amount of time (e.g., green represents 5 minutes or more, yellow represents 10 minutes or more, etc.). In certain embodiments, the indicator indicates an actual amount of time (i.e., based on an average of the aggregated amount).

In certain embodiments, the scroll engine 120 may "send" information back to the search engine 160 through the browser 110 in response to a user clicking on any of the indicators on the scroll bar and "liking" or "disliking" that indicator (i.e., meaning that the user either agrees or disagrees with the popularity of that portion of the page).

In certain embodiments, users may give more weight to the amount of time spent on portions of pages by people they know or who are closely related to them through a social network. In such embodiments, the amounts used for aggregation (block 206) may be filtered based on a subset of users (e.g., those in a social network with a user currently viewing the page, those in a particular profession, etc.).

In certain embodiments, the scroll engine 120 may use input from a web camera, a motion detector, key stroke monitor, etc. to determine whether the scroll bar being on a portion of a page should be counted.

The scroll engine 120 also takes into account screen size to adjust between different devices (e.g., a laptop computer and a smart phone).

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
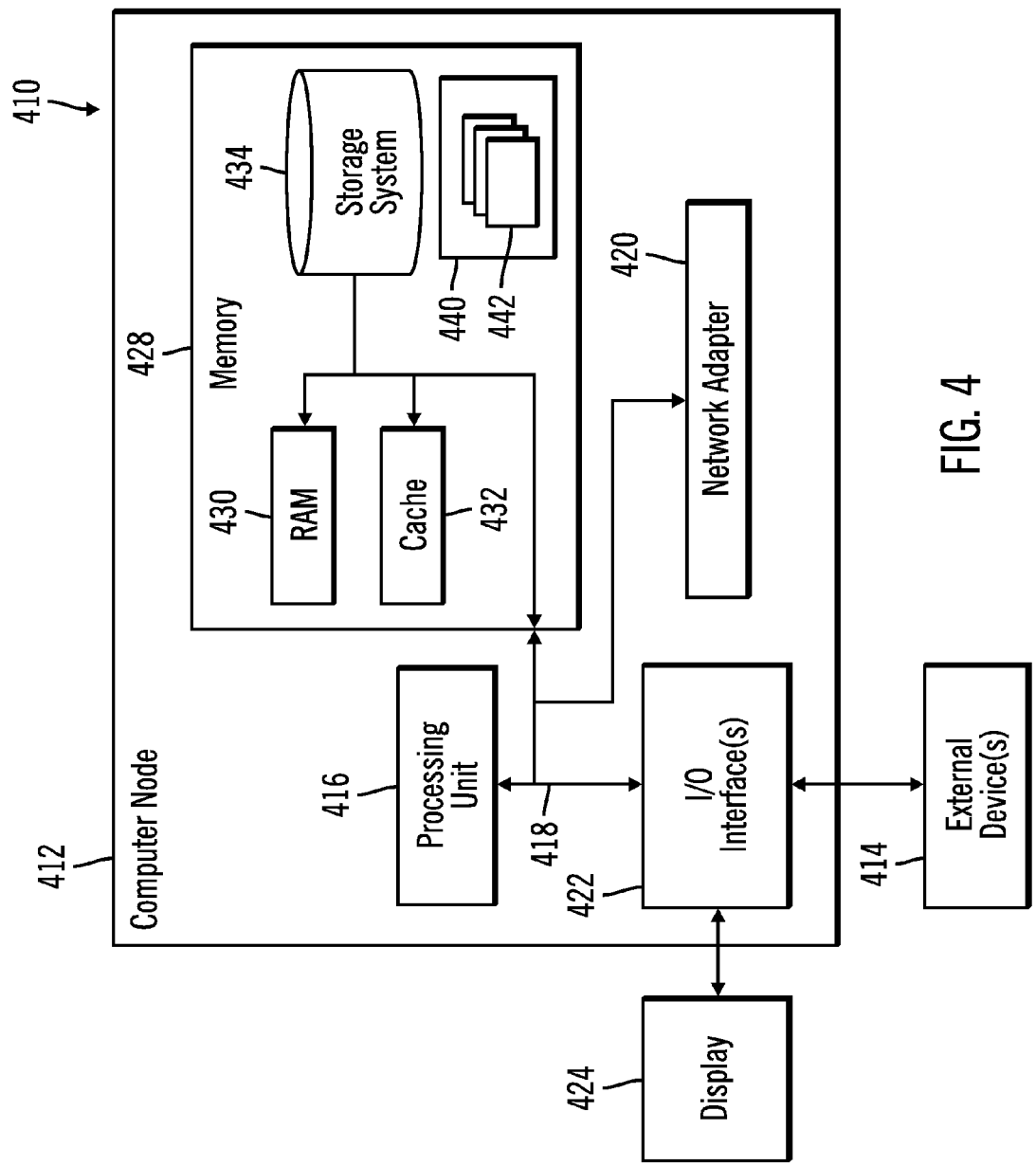
FIG. 4 illustrates a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to a processor or processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
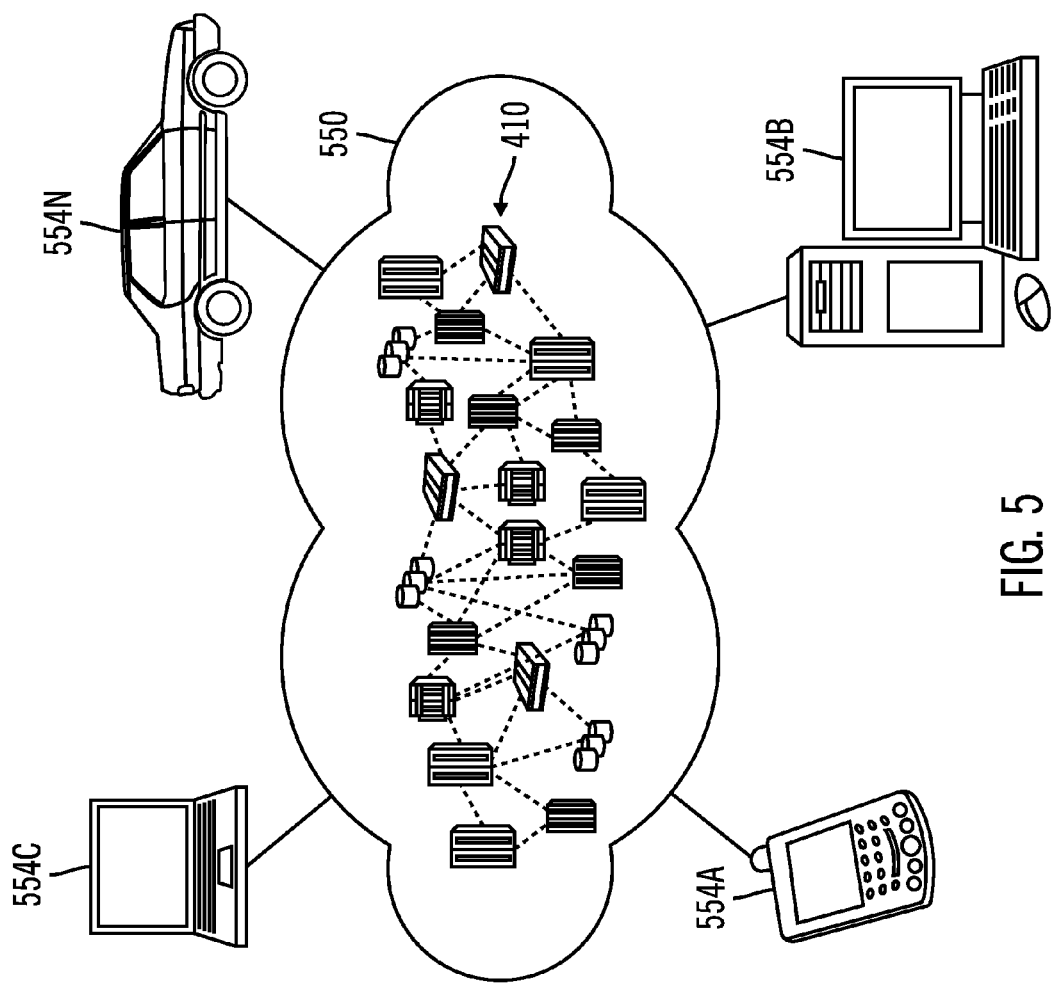
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
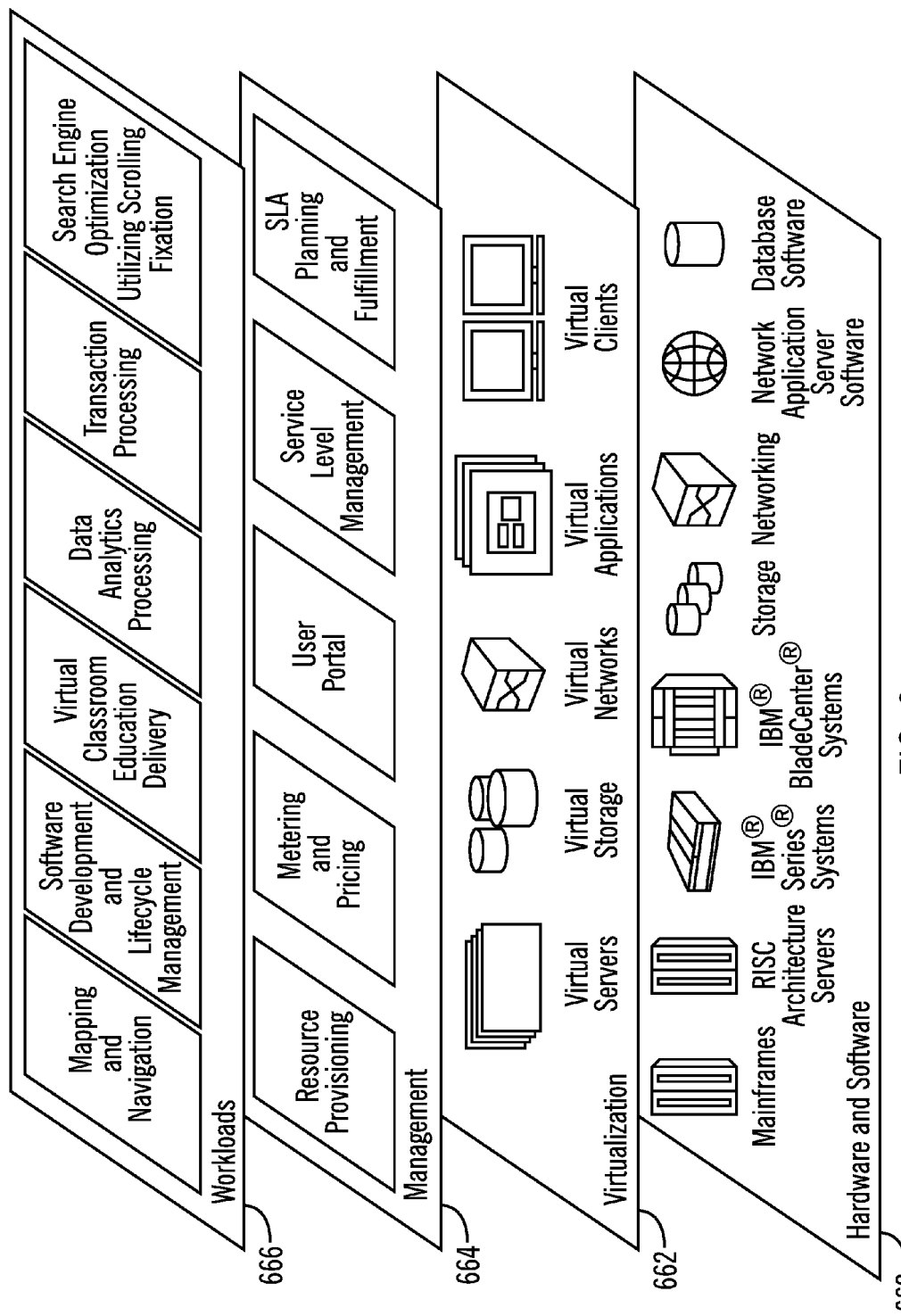
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and search engine optimization utilizing scrolling fixation.

Thus, in certain embodiments, software or a program, implementing search engine optimization utilizing scrolling fixation in accordance with embodiments described herein, is provided as a service in a cloud environment.

Thus, in certain embodiments, software or a program, implementing search engine optimization in accordance with embodiments described herein, is provided as a service in a cloud environment.

In certain embodiments, the client computer 100 and/or the server computer 150 have the architecture of computing node 410. In certain embodiments, the client computer 100 and the server computer 150 are part of a cloud environment. In certain alternative embodiments, the client computer 100 and/or the server computer 150 are not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagram show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product, the computer program product comprising:
   a non-transitory computer readable storage medium having computer readable program code embodied therewith, the computer readable program code, when executed by at least one processor of a computer, is configured to perform:
   monitoring an amount of time a user spends on each portion of a page based on scroll bar usage by the user;
   identifying other users who spent time on each portion of the page based on scroll bar usage by the other users;
   for each of the user and the other users,
      maintaining a counter for each portion of the page;
      in response to the scroll bar being on a first portion of the page above a maximum threshold of time, not incrementing a first counter for the first portion;
      receiving movement of the scroll bar to a second portion of the page;
      in response to the scroll bar being on the second portion of the page for at least a minimum threshold of time and not exceeding the maximum threshold of time, incrementing a second counter for the second portion;
   filtering the other users to identify at least one other user who is in a social network with the user;
   aggregating the amount of time the user spends on the second portion of the page with an amount of time the at least one other user spent on the second portion of the page based on scroll bar usage by the at least one other user; and
   displaying a scroll bar with an indicator that represents an aggregated amount of time spent on the second portion of the page.

2. The computer program product of claim 1, wherein the aggregated amount of time represents an average amount of time spent by the user and the at least one other user.

3. The computer program product of claim 1, wherein the computer readable program code, when executed by the at least one processor of the computer, is configured to perform:
   in response to a user selecting the indicator, jumping to the second portion of the page.

4. The computer program product of claim 1, wherein the second portion of the page is a horizontal strip of the page.

5. The computer program product of claim 1, wherein the computer readable program code, when executed by the at least one processor of the computer, is configured to perform:
   sending the monitored amount of time from a browser to a search engine; and
   receiving the amount of time the at least one other user spent on the second portion of the page from the search engine at the browser.

6. The computer program product of claim 1, wherein a search engine accumulates the amount of time from multiple users at the search engine on a per page basis.

7. The computer program product of claim 1, wherein a Software as a Service (SaaS) is configured to perform the computer program product operations.

8. A computer system, comprising:

a processor; and a storage device connected to the processor, wherein the storage device has stored thereon a program, wherein the processor is configured to execute instructions of the program to perform operations, and wherein the operations comprise:

monitoring an amount of time a user spends on a portion of a page based on scroll bar usage by the user;

identifying other users who spent time on that portion of the page based on scroll bar usage by the other users;

for each of the user and the other users,
- maintaining a counter for each portion of the page;
- in response to the scroll bar being on a first portion of the page above a maximum threshold of time, not incrementing a first counter for the first portion;
- receiving movement of the scroll bar to a second portion of the page;
- in response to the scroll bar being on the second portion of the page for at least a minimum threshold of time and not exceeding the maximum threshold of time, incrementing a second counter for the second portion;

filtering the other users to identify at least one other user who is in a social network with the user;

aggregating the amount of time the user spends on the second portion of the page with an amount of time the at least one other user spent on the second portion of the page based on scroll bar usage by the at least one other user; and displaying a scroll bar with an indicator that represents an aggregated amount of time spent on the second portion of the page.

9. The computer system of claim 8, wherein the aggregated amount of time represents an average amount of time spent by the user and the at least one other user.

10. The computer system of claim 8, wherein the operations further comprise:

in response to a user selecting the indicator, jumping to the second portion of the page.

11. The computer system of claim 8, wherein the second portion of the page is a horizontal strip of the page.

12. The computer system of claim 8, wherein the operations further comprise:

sending the monitored amount of time from a browser to a search engine; and receiving the amount of time the at least one other user spent on the second portion of the page from the search engine at the browser.

13. The computer system of claim 8, wherein a search engine accumulates the amount of time from multiple users at the search engine on a per page basis.

14. The computer system of claim 8, wherein a Software as a Service (SaaS) is provided to perform the system operations.

15. The computer program product of claim 1, wherein each of the indicators has a different color.

16. The computer system of claim 8, wherein each of the indicators has a different color.

* * * * *